United States Patent Office 3,372,198
Patented Mar. 5, 1968

3,372,198
VINYLATION OF ORGANIC COMPOUNDS
Norbert F. Cywinski, Bartlesville, Okla., assignor to Phillips Petroleum Company, a corporation of Delaware
No Drawing. Continuation-in-part of application Ser. No. 150,648, Nov. 7, 1961. This application Apr. 18, 1963, Ser. No. 273,815
4 Claims. (Cl. 260—597)

This is a continuation-in-part of my copending application Ser. No. 150,648, filed Nov. 7, 1961 and now abandoned.

This invention relates to the production of vinylated oxygen-containing and nitrogen-containing compounds from at least one of acetylene and an alpha-acetylene. In one of its aspects, the invention relates to the production of a vinyl alcohol from an acetylene as described herein by the reaction of said acetylene with an alcohol wherein the hydroxyl group carbon atom has attached to its at least one hydrogen atom. In another of its aspects, the invention relates to the production of a vinyl ketone from an acetylene as described herein by reaction of said acetylene with a ketone wherein at least one carbon atom attached to the ketone group has attached thereto at least one hydrogen atom. In a further aspect of the invention, it relates to the production of a vinyl ether by reaction of an acetylene as herein described with an ether having at least one hydrogen atom attached to at least one carbon atom attached to the oxygen atom. In another aspect of the invention, it relates to a reaction as herein described effected in conjunction with a chemical free radical initiator. In a further aspect still, the invention relates to a reaction as herein described in which ultraviolet is used in conjunction with the chemical free radical initiator.

In a further aspect, this invention relates to the production of vinyl amines in the presence of free radical initiators.

In another aspect, this invention relates to the formation of vinyl esters by free radical initiation.

In a further aspect, this invention relates to the production of amides containing a vinyl group in the presence of free radical initiators.

It has now been found that an acetylene as herein described can be reacted with an alcohol, a ketone, an ether, an ester, an amine, an amide, and the like, as herein described, in the presence of a chemical free radical initiator such as an organic peroxide, an organic hydroperoxide, an azo compound, metal alkyls, etc., and actinic and gamma radiation.

It is an object of the present invention to produce vinyl oxygen-containing compounds from acetylene and/or an alpha-acetylene. It is also an object of this invention to produce vinyl nitrogen-containing compounds. It is a further object of this invention to produce a vinyl amine. It is a further object of this invention to produce a vinyl amide. It is a further object of this invention to produce a vinyl ester. It is a further object of this invention to produce a vinyl alcohol. It is a further object of this invention to produce a vinyl ketone. It is a further object of this invention to produce a vinyl ether.

Other aspects, objects and the several advantages of the invention are apparent from a study of this disclosure and the appended claims.

According to the invention set forth in said copending application, there is provided a process for the production of an oxygen-containing compound from one of acetylene and an alpha-acetylene containing 3-5 carbon atoms to the molecule which comprises reacting at least one of said acetylenes with at least one of a primary and secondary alcohol having 1–15 carbon atoms to the molecule, said alcohol having at least one hydrogen atom attached to the carbon atom to which the hydroxyl group is attached; a ketone having 3–15 carbon atoms to the molecule, said ketone having at least one hydrogen atom attached to at least one of the carbon atoms attached to the ketone group; and an ether having 2–15 carbon atoms, said ether having at least one hydrogen attached to the carbon attached to the oxygen atom; in the presence of a chemical free radical initiator at a pressure sufficient to maintain a liquid phase.

It has now been found according to the invention that saturated alcohols, ketones, ethers, esters, amines and amides containing up to and including 24 total carbon atoms, preferably 15 total carbon atoms, can be vinylated by interaction with 1-acetylenes in the presence of free radical initiators.

Thus, according to the invention, a process is provided for the vinylation of organic compounds which comprises contacting (1) at least one saturated organic compound containing up to and including 24 carbon atoms, said organic compound having a hydrogen attached to a carbon which is attached to a functional group selected from —OH,

—O—, and —N< with (2) at least one 1-acetylene containing from 2 to 5, inclusive, carbon atoms in the presence of a source of free radicals.

The process of the invention is carried out by reacting a mixture of one of the saturated organic compounds, e.g., alcohol, ketone, ether, ester, amines, amide, and a 1-acetylene, e.g., acetylene, in the presence or absence of an inert non-reactive diluene under free radical conditions, that is, in the presence of a source of free radicals, e.g., actinic radiation and gamma radiation or a catalyst which will decompose to give free radicals, the temperature employed being sufficient to effect decomposition of any such catalytic material with consequent production of free radicals.

The amines reacted according to the invention can be represented by the formula

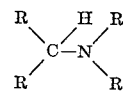

wherein R is selected from hydrogen, saturated aliphatic, saturated cycloaliphatic, and aromatic radicals, and combinations thereof, and compounds wherein at least 2 R's and N can be 5- and 6-membered rings, and the total number of carbon atoms does not exceed about 24.

The amides according to the invention can be represented by the formula

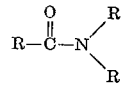

wherein R is selected from hydrogen and hydrocarbon radicals selected from saturated aliphatic, saturated cycloaliphatic, and aromatic radicals, at least one of said R's being a hydrocarbon radical containing at least 2 carbon atoms in which there is a carbon atom with a hydrogen attached to the

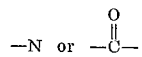

groups, and the total number of carbon atoms does not exceed about 24.

The esters and ethers according to the invention can be represented by the formulas

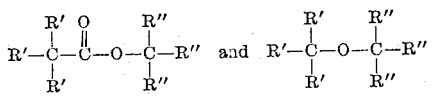

wherein R' and R" are selected from hydrogen and hydrocarbon radicals selected from saturated aliphatic, saturated cycloaliphatic, and aromatic radicals, at least one of R' and R" being hydrogen, and the total number of carbon atoms does not exceed about 24.

The alcohols and ketones of the invention can be represented by the formulas

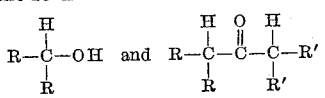

wherein R and R' are selected from hydrogen and hydrocarbon radicals selected from saturated aliphatic, saturated cycloaliphatic, and aromatic radicals, and the total number of carbon atoms does not exceed about 24.

Illustrative examples of compounds that can be vinylated according to the invention include: methanol, ethanol, isopropanol, sec-butyl alcohol, benzyl alcohol, n-decyl alcohol, 3-(1-naphthyl) - 8 - hydroxytetradecane, methyl ethyl ketone, acetone, hexanone-2, 2,6-dimethylheptanone-4, tetradecanone-2, 3-cyclohexyl-6-cyclopentyltridecanone-12, dimethyl ether, diethyl ether, methyl n-butyl ether, di-n-dodecyl ether, 3-phenyl-n-butyl 3-cyclohexyl-n-pentyl ether, methyl benzyl ether, methyl isobutyrate, n-propyl n-valerate, n-tetradecyl 3-phenyl-n-butyrate, n-nonyl pelarganate, butylamine, N-n-propyl-N-ethyl-n-hexylamine, 1-n-butyl-2-methylpiperidine, N,N-di-n-octylisooctylamine, 1-methyl-2-n-propyl-4-n-pentylpyrrolidine, N,N-dimethylacetamide, N-n-propyl-n-valeramide, N-n-pentadecyl-N-n-heptylacetamide, N-ethyl-N-n-propyl-4-methylhexamide, and the like.

The reaction can be carried out either batchwise or continuously in conventional equipment, such as stirred or jet-agitated reactors, pipe reactors in which turbulence causes mixing, or other forms well known in the art.

The acetylenic compounds or materials that can be employed according to the invention are the 1-acetylenes containing from 2 to 5 carbon atoms and include acetylene, 1-propyne, 1-butyne, 1-pentyne, and 3-methyl-1-butyne and mixtures thereof. Best results are obtained by using 1–30 mol percent of the acetylenic compound, based on the reactants charged. The usual precautions for handling acetylene under pressure should be observed. Explosions can be prevented in handling acetylene under pressure by dilution with other gases (nitrogen, methane, etc.), operating with limited free space in the lines and vessels in which acetylene is under pressure, and other means known in the art for handling acetylene.

As indicated above, the condensation reaction of the invention is carried out in the presence of a free radical initiator. Suitable initiators for furnishing free radicals are organic peroxy and azo compounds which have half lives in the range of 0.05 to 20 hours at reaction conditions, actinic radiation, gamma radiation, and metal alkyls of the metals of Groups IIb and IVb of the Periodic System (Mendelyeev).

Representative examples of suitable organic peroxy and azo free radical initiators include di-tert-butyl peroxide, tert-butyl hydroperoxide, benzoyl peroxide, azobisisobutyronitrile, tert-butylbenzene hydroperoxide, dicumyl peroxide, and the like.

Also, according to the invention, actinic rays such as ultraviolet rays which have a photochemical effect can be employed in conjunction with the organic peroxy and azo free radical initiators, in particular, to increase the reaction rate and reduce the temperature and/or time requirement for equivalent conversion. Ultraviolet, for example, assists in starting free radical formation.

When either actinic or gamma radiation is used, the total dosage of radiation to which the reaction mixture is exposed is in the range of $10^6$ to $10^{10}$ roentgens. The rate of exposure to the radiation is generally at the rate of $10^5$ to $10^{11}$ roentgens per hour until said reaction mixture has received said total dosage, although higher or lower rates can be employed.

Numerous sources of gamma rays for irradiation of the reaction mixture are available. Such sources as spent fuel elements from nuclear reactors are quite satisfactory and may be very economically used, for these are ordinarily allowed only to deteriorate in activity and then reprocessed for recovery of the fissionable material. By using these spent fuel elements in this process, the radiant energy available as gamma rays is put to use in producing valuable alkenyl compounds. Other sources of gamma rays, of course, may be utilized, for example, radioactive materials such as cobalt-60 and similar radioactive materials. Any other suitable source of gamma radiation can be used.

It is also within the scope of the invention to employ metal alkyls of the metals of Groups IIb and IVb of the Periodic System (Mendelyeev) including specifically zinc, cadmium, mercury, germanium, tin and lead as free radical initiators. Ordinarily the alkyl groups will contain from 1 to 5, inclusive, carbon atoms, although longer chain alkyl groups can be employed under some circumstances, and the alkyl groups substituted on each metal can be the same or different. Representative examples of suitable metal alkyls that can be used include dimethylzinc, dibutylzinc, diethylcadmium, dimethylmercury, dipropylmercury, diamylmercury, tetraethylgermanium, tetramethyltin, tetraethyllead, and the like.

A discussion of the chemical reactions of tetraethyllead, including its use as a free-radical initiator, can be found on pages 306–318 of "Advances in Chemistry," No. 23, American Chemical Society, 1959. A general discussion on metal alkyls as compounds which can provide free radicals can be found in "Free Radicals, an Introduction," Trotman-Dickenson, Wiley, 1959.

Although the mechanism of the reactions involved in the present process are not completely understood, the reactions between the various disclosed organic reactants and acetylene, for example, can be generally expressed as follows:

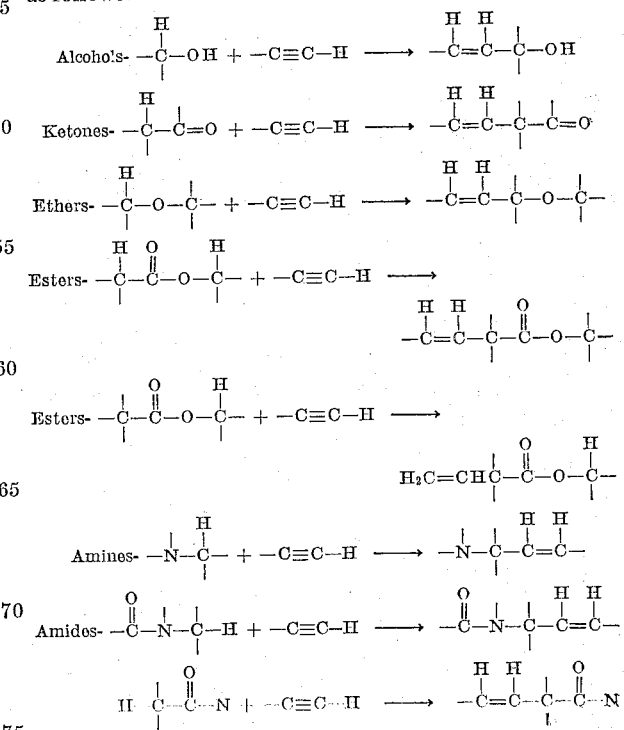

Thus, in carrying out the invention, I react, for example, methanol with acetylene and obtain allyl alcohol. Similarly, ethanol upon reaction with acetylene yields methylvinylcarbinol; sec-butyl alcohol and acetylene yield 3-hydroxy-3-methylpentene-1; methyl ethyl ketone and acetylene yield 3-methyl-1-pentene-4-one and some 1-hexene-4-one, especially when an excess of acetylene is used; 3-cyclohexyl-6-cyclopentyltridecanone-12 and acetylene yield 3-cyclohexyl-6-cyclopentyl - 11 - vinyl-tridecanone-12; di-n-dodecyl ether and acetylene yield n-dodecyl 1-vinyl-n-dodecyl ether; n-propyl- n-valerate and acetylene yield n-propyl 2-vinyl-n-valerate; N,N-di-n-octyl-isooctylamine and propyne yield N,N-di-n-octyl-1-(1-propenyl)-isooctylamine; N,N-dimethylacetamide and acetylene yield N-allyl-N-methylacetamide; and the like. It should be realized that small amounts of additional products are often formed with each of the above reactions depending upon the reactants and conditions employed.

The reaction temperature is in the range of about 30° F. to about 900° F., often from 30 to about 500° F., preferably 100 to 400° F.; and the reaction pressure is sufficient to maintain a liquid phase, e.g., atmospheric to about 5000 p.s.i.g. Reaction time varies inversely with the temperature and is from 0.1 second to 100 hours or more, preferably 1 second to 1 hour. The use of ultraviolet light in conjunction with the peroxide increases the reaction rate and reduces the temperature and/or time requirement for equivalent conversion. The mol ratio of organic reactant to initiator generally ranges from 10,000/1 to 2/1, preferably 750/1 to 10/1. The mol ratio of 1-acetylene to initiator ordinarily ranges from 150/1 to 2/1, preferably 100/1 to 5/1.

As this reaction apepars to be a chain reaction once it is initiated, it is desirable to keep the reaction free of chain terminating compounds, e.g., mercaptans and quinones, as practical. High feed purity with respect to these undesirable chain terminating components produces higher yields of product based on the initiator. Any of the known means for removing such contaminants can be used.

The following are examples of operations or processes according to the present invention.

EXAMPLE I

*Vinylation of alcohols by free radical addition to acetylenes*

The experiments were effected in a one-liter, high-pressure, stainless steel stirred autoclave. The mixture of alcohol and di-t-butyl peroxide was added to the autoclave which was then flushed three times with nitrogen by pressuring to several hundred pounds and then venting and pressure tested therewith. After venting, the autoclave was flushed once by pressuring to 100 p.s.i. with acetylene and venting and then pressuring to 100 p.s.i. with acetylene. The autoclave was then heated to 140° C. (284° F.). The reaction was effected at this temperature with continuous addition of acetylene for a period in the range 5–6 hours, at the end of which time acetylene was shut off, the reaction mixture heated overnight to decompose residual peroxide. Pressure during addition of acetylene was maintained at 280–300 p.s.i.g. The vapor pressure of the alcohols charged was approximately 100 pounds per square inch at the reaction temperature giving a partial pressure of acetylene employed of approximately 200 p.s.i. with slight variations due to different amounts of methane and propylene produced in various runs. The product of each run was subjected to a flash vacuum distillation using a water aspirator. Light ends were allowed to escape to prevent any acetylene-rich fraction accumulating in a trap. Heavy ends remained as a pot residue. The fraction of normal boiling point 50–150° F. was distilled at a pressure of 100 millimeters decreasing to 20 millimeters at the end of the distillation whereupon the fraction was used for analysis by gas chromatography.

Proceeding as outlined, allyl alcohol was obtained by vinylation of methanol and was identified by comparison of its boiling point, infrared spectrum and column retention time with that of a known sample.

Similarly, methylvinylcarbinol was obtained by vinylation of ethanol and had a boiling point 96.2° C., $n_D^{20}$ 1.4142. The infrared spectrum was identical with one published in the literature for pure material of boiling point 94.2–96.2° C., $n_D^{25}$ 1.4121. Similarly, dimethylvinylcarbinol was obtained by vinylation of isopropanol and had a boiling point of 95.5–95.7° C., $n_D^{20}$ 1.4168. The infrared spectrum was identical with that of a sample prepared by selective hydrogenation of 3-methyl-1-butyn-3-ol.

It is interesting to note that t-butyl alcohol did not yield any vinylic product, when acetylene was reacted.

The foregoing shows that vinylation of alcohols by free radical addition to acetylene, as herein described, is a simple, dependable method of producing certain unsaturated alcohols. The addition appears to take place to yield a vinyl group adjacent the hydroxyl group. Where the hydroxyl group is attached to a secondary carbon as in isopropanol, only one product is obtained.

With a compound such as t-butyl alcohol which contains no hydrogen atoms on the carbon atom attached to the hydroxyl group, no vinylation occurs. Isobutyl alcohol (2-methyl-n-propanol), however, has the requisite structure and can be used in the process of this invention.

In the addition of isopropanol to acetylene, a chain of at least 6 carbon atoms was achieved.

According to the invention, isopropyl alcohol can be used as a solvent for removal of acetylene from ethylene streams. The solution of acetylene in isopropyl alcohol is then treated with a suitable free radical initiator and heated to decompose the initiator and produce dimethylvinylcarbinol. Such a process is advantageous because it requires no purification of the acetylene. Isopropyl alcohol which does not react can be recovered and recycled as a stripping solvent. Thus, a two-fold effect is obtained, the acetylene is removed thus purifying the ethylene stream and a product which is also useful is obtained.

EXAMPLE II.—PREPARATION OF KETONES

*Reaction of methyl ethyl ketone and acetylene initiated by di-t-butyl peroxide*

Four hundred and sixty-seven ml. (371 g., 5.16 mols) of methyl ethyl ketone and 63 ml. (48 g., 0.33 mol) of di-t-butyl peroxide were placed in a one-liter stirred autoclave. The autoclave was flushed with nitrogen. Nitrogen was vented to 100 p.s.i.g. at 100° C. Acetylene was added so that partial pressure of acetylene was approximately 100 p.s.i. at 140° C. with a total pressure of 300 p.s.i. due to acetylene, nitrogen and methyl ethyl ketone vapor.

The reaction mixture was heated 27 hours at 140° C. with addition of acetylene as required to maintain pressure during the first 7 hours.

After cooling and venting acetylene, 433 g. of liquid was recovered. Analysis by gas chromatography showed three components heavier than methyl ethyl ketone. The first of these amounting to 3.9 g. was in the boiling point range expected for 3-methyl-1-pentene-4-one. The two other components amounting to 1.4 and 1.5 g. were of considerably higher boiling point than expected for 3-methyl-1-pentene-4-one.

*Reaction of acetone and acetylene initiated by di-t-butyl peroxide*

Six hundred fifty ml. (514 g., 8.8 mols) of acetone and 75 ml. (59 g., 0.40 mol) of di-t-butyl peroxide were placed in a one-liter autoclave. The autoclave was flushed with nitrogen. Nitrogen was vented and acetylene added as the autoclave was heated so that total pressure was 300 p.s.i., at 140° C. Acetone pressure was about 135 p.s.i. and acetylene pressure about 170 p.s.i.

After cooling and venting nitrogen, 590 g. of liquid was recovered. This recovered liquid was analyzed by gas chromatography. This analysis showed a small amount of a component heavier than acetone.

EXAMPLE III

Reaction of ethyl ether and acetylene

Six hundred forty ml. (454 g., 6.12 mols) of diethyl ether and 75 ml. (58 g., 0.40 mol) of di-t-butyl peroxide were placed in a one-liter stirred autoclave. The autoclave was flushed with nitrogen, then pressured with acetylene. Acetylene pressure was adjusted to be approximately 150 p.s.i. at 140° C. with a total pressure of approximately 300 p.s.i. due to acetylene and vapor pressure of ethyl ether.

The reaction mixture was heated for 9 hours at 140° C. with addition of acetylene as required to maintain pressure. After cooling and venting acetylene, 397 g. of liquid was obtained. (Losses were mostly ether lost in flushing with nitrogen and in venting acetylene.) The recovered liquid was washed with water and distilled using n-octane as a chaser. A pure cut of 3.4 g., B.P. 77.2° C., $n_D^{20}$ 1.3891 was obtained. The infrared spectrum showed absorption bands characteristics of vinyl unsaturation.

The product was positively identified as 3-ethoxybutene-1 by analysis of its nuclear magnetic resonance spectrum which showed three groups of peaks. The first group was at a position characteristic of vinyl hydrogen, the second of methylene or tertiary hydrogen adjacent to oxygen and the third of hydrogen in a methyl group in a ratio of 1:1:2. The methyl peaks were an unsymmetrical triplet suggesting two non-equivalent methyl groups, one attached to a methylene group, the other to a carbon with only one hydrogen.

Analysis of the crude reaction mixture by gas chromatography gave a value of 8.0 g. of 3-ethoxybutene-1 formed in the reaction.

EXAMPLE IV

Vinylation of esters

In a one-liter stirred autoclave, 498 grams (4.88 mols) of methyl isobutyrate and 19 grams (0.134 mol) of di-tert-butyl peroxide were mixed, and flushed with nitrogen. Acetylene was added to a pressure of 100 p.s.i.g., nitrogen was added to a total pressure of 240 p.s.i.g. (at reaction temperature), and the mixture was heated and stirred for 8 hours at a temperature of 145° C. After cooling and removing the reaction mixture from the autoclave, the recovered product was distilled, and yielded 22 grams of a product boiling at 126.6° C. and having a refractive index ($n_D^{20}$) of 1.4162. The structure of this material was established by the infrared spectrum, which showed strong vinyl hydrogen absorption bands and the nuclear magnetic resonance spectrum, which showed the following values:

| | Percent |
|---|---|
| Olefinic hydrogen | 25.3 |
| CH₃ beta to carbonyl | 50.0 |
| CH₃ in —C(=O)—O—CH₃ | 24.7 |

These values indicate that the reaction product is methyl dimethylvinylacetate formed by the reaction:

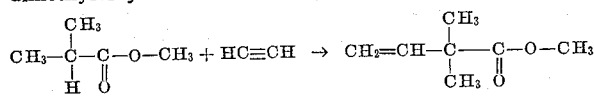

There was no indication of any product by reaction at the methoxyl group of the ester. An elemental analysis gave C, 66.4 percent; H, 9.7 percent (calculated for methyl dimethylvinylacetate: C, 65.6 percent; H, 9.4 percent).

EXAMPLE V

The tests in this example were made by placing the liquid reactants in a one-liter stirred autoclave, flushing the autoclave with nitrogen, adding nitrogen and acetylene to a total pressure of about 220 p.s.i.g. and an acetylene partial pressure of about 100 p.s.i.g., heated for 5 to 7 hours at a temperature of about 145° C. (293° F.) with continuous addition of acetylene to maintain a total pressure of about 220 p.s.i.g., cooling the autoclave, venting the gases, and analyzing the recovered liquids.

In a reaction as described above, 607.5 grams (6.97 mols) of N,N-dimethylacetamide and 39.5 grams (0.27 mol) of di-tert-butyl peroxide were reacted with acetylene. After cooling the autoclave and venting the gases, 668 grams of liquid was recovered. The liquid was flash-distilled under vacuum to separate heavy ends amounting to 112 grams. Upon analysis by gas chromatography using a 6-foot column of Carbowax on Teflon at a temperature of 149° C., a peak amounting to 1.9 weight percent of the sample was found corresponding to N-allyl-N-methylacetamide. Presence of the vinyl group was further confirmed by infrared analysis.

EXAMPLE VI

Vinylation of amines

A run was made in which 477 grams (6.54 mols) of butyl amine and 39 grams (0.27 mol) of di-tert-butyl peroxide were placed in a one-liter stirred autoclave, the autoclave was flushed with nitrogen, and nitrogen and acetylene were added to a total pressure of 230 p.s.i.g. and an acetylene partial pressure of 100 p.s.i.g.—both at reaction temperature. The reaction mixture was heated and stirred at 140° C. (284° F.) for 5.5 hours, adding acetylene as needed to maintain the total pressure at 230 p.s.i.g. The autoclave was then cooled, the gases were vented, and the liquid products were analyzed. Twenty grams of a material boiling at 113.7° C. (236.7° F.) was isolated by distillation. This material was identified as 3-aminohexene-1 by infrared analysis, which showed characteristic vinyl hydrogen absorption bands, and by nuclear magnetic resonance analysis, which indicated the following percentages of hydrogen:

| | Olefin | CH Adjacent to NH₂ and olefins | NH₂ | CH₂ | CH₃ |
|---|---|---|---|---|---|
| Sample | 22.8 | 7.2 | 15.4 | 31.0 | 23.6 |
| Calc'd for 3-aminohexene-1 | 23.1 | 7.7 | 15.4 | 30.7 | 23.1 |

It is within the scope of the present invention to have one or more of the alcohols, ketone, ether, ester, amide and amine present to effect a simultaneous reaction from which individual products as may be desired can be recovered.

It will be evident to those skilled in the art that many variations and modifications can be practiced upon consideration of the foregoing disclosure. Such variations and modifications are believed to be within the spirit and scope of the present invention.

I claim:
1. A process for the production of a ketone from one of acetylene and an alpha-acetylene containing 3–5 carbon atoms to the molecule which comprises reacting at least one of said acetylenes with a ketone having 3–15 carbon atoms to the molecule, said ketone having at least one hydrogen atom attached to at least one of the carbon atoms attached to the ketone group, in the presence of a chemical-free radical initiator at a pressure sufficient to maintain the liquid phase.

2. A process according to claim 1 wherein the reaction is effected at a temperature in the range 30–500° F.

3. A process according to claim 1 wherein the initiator is selected from the group consisting of di-tert-butyl peroxide, di-tert-butyl hydroperoxide, benzoyl peroxide and azobisisobutyronitrile.

4. The process according to claim 1 wherein methyl ethyl ketone is reacted with acetylene using di-tert-butyl peroxide as the chemical free radical initiator.

(References on following page)

References Cited

UNITED STATES PATENTS

| | | | |
|---|---|---|---|
| 2,411,158 | 11/1946 | Hanford | 260—586 |
| 2,432,287 | 12/1947 | Cramer | 260—586 |
| 3,256,315 | 6/1966 | David et al. | 260—465 |

OTHER REFERENCES

Urry: J.A.C.S., vol. 75, Jan. 5, 1953, pp. 250–251.

Kharasch et al.: J. Org. Chem. 14, 248–253 (1963).

Schlubach et al.: Liebig's Annalen 587, 124–131 (1954).

Adams et al.: Organic Reactions, vol. 13, page 132 (1963).

DANIEL D. HORWITZ, *Primary Examiner.*

H. G. MOORE, *Examiner.*

D. P. CLARKE, *Assistant Examiner.*